Aug. 5, 1969   F. D. LASSWELL, JR   3,458,982
FRUIT PICKING SPINDLE AND ARRANGEMENT THEREFOR
Filed Dec. 1, 1966   2 Sheets-Sheet 1

Inventor:
Fred D. Lasswell, Jr.
By Snow and Benno
Attys.

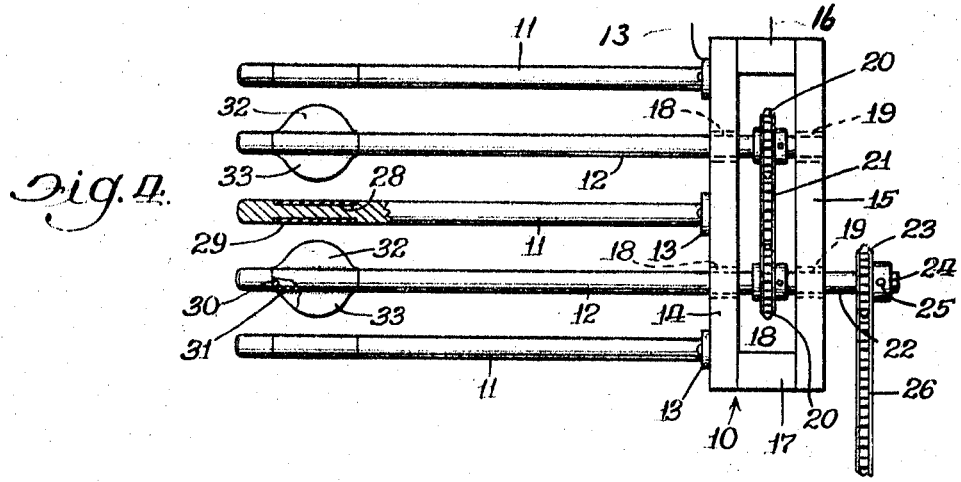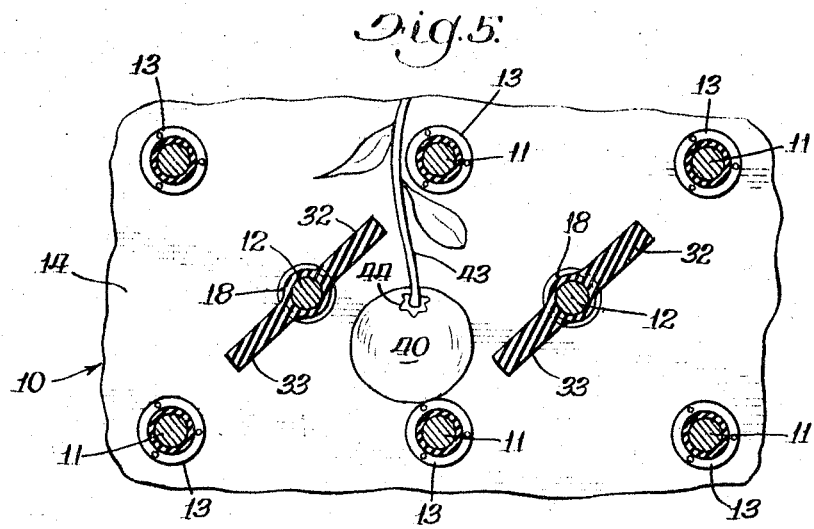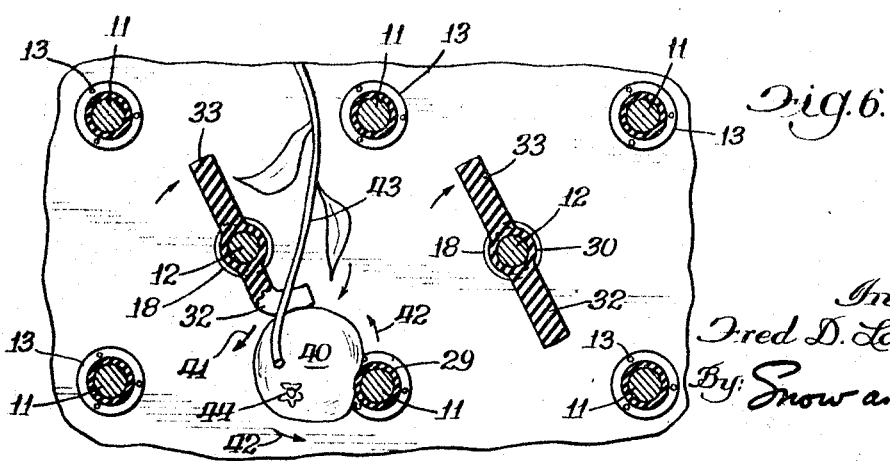

United States Patent Office

3,458,982
Patented Aug. 5, 1969

1

3,458,982
FRUIT PICKING SPINDLE AND ARRANGEMENT THEREFOR
Fred D. Lasswell, Jr., 205 Brorein St., Tampa, Fla. 33606
Filed Dec. 1, 1966, Ser. No. 598,374
Int. Cl. A01g 19/00
U.S. Cl. 56—328      5 Claims

ABSTRACT OF THE DISCLOSURE

A fruit harvester in which there is included a plurality of picking spindles for penetrating the outer surface of a tree defined by the ends of the tree branches so that the spindles are in the proximity of the fruit growing on the tree. Certain of the spindles are rotating and are provided with fins to engage the fruit and cause it to spin loose. Certain of the other spindles are finless. It is the particular alternating rows of finned spindles and finless spindles that forms the subject of this invention.

---

This invention relates to a new and improved fruit picking spindle and arrangement therefor and is an improvement over the various features in my prior fruit harvester Patents 3,040,507, 3,129,551, and 3,222,855.

The present invention is concerned with that type of fruit picker having a plurality of spindles adapted to be inserted into the periphery of a tree bearing hard fruit so that the spindles and means on the spindles cooperate to engage the fruit and cause removal of the fruit from the tree.

A principal object of this invention is to provide a fruit picker having a picking head in which there is included a novel arrangement of fruit engaging spindles.

An important object of this invention is to provide a novel fruit picker head in which the head includes a plurality of stationary spindles and a plurality of rotating spindles and the spindles cooperating in such a manner to pick fruit from a tree into which the spindles are inserted.

Another important object of this invention is the provision of a novel spindle construction for a fruit picker in which the spindle includes rigid portions and rubber portions to effect a removal of fruit from a tree.

Still another important object of this invention is to provide a novel fruit picking rotatable spindle with diametrically disposed rubber fins to cooperate with each other and with stationary spindles to effect removal of fruit from a tree.

Other and further important objects and advantages will become apparent from the disclosures in the following specification and accompanying drawings:

In the drawings:

FIGURE 4 is a side elevational view partly in section of the fruit picking panel as taken on the line 4—4 of FIGURE 1.

FIGURE 5 is an enlarged detail sectional view similar to FIGURE 2 showing another position of fruit to be harvested within the confines of the spindles of the fruit picking panel.

2

Figure 3:
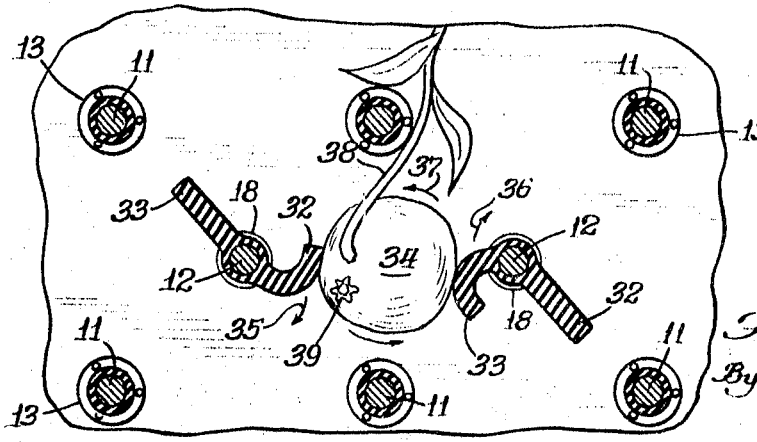
FIGURE 3 is a view similar to FIGURE 2 with the finned spindles rotated and having certain portions engaging the fruit to be harvested in a spinning or twisting action causing the removal of the fruit from its stem.

FIGURE 6 is a view similar to FIGURE 3 and showing the finned spindles rotated relative to their positions in FIGURE 5 and engaging and snubbing the fruit to be harvested against one of the stationary spindles.

As shown in the drawings:

The reference numeral 10 indicates generally a panel which comprises the fruit harvesting mechanism for engaging a fruit bearing tree. The panel is oftentimes termed a head or support upon which is carried a plurality of spindles which comprise metal rods or shaft like elements. Stationary spindles 11 are arranged in generally horizontal, vertically spaced apart rows across the face of the panel. The spindles project generally at right angles to the face of the panel 10 and are adapted to penetrate the outer surface of the tree in the harvesting of fruit from that tree. The panel also includes a plurality of rotating spindles 12 which are arranged in generally horizontal rows across the face of the panel and these rows are disposed in alternate arrangement with the rows of stationary spindles 11. The rotating spindles 12 lie parallel with the stationary spindles 11 and again are disposed at generally right angles to the face of the harvesting panel 10.

The stationary spindles 11 also define generally vertical rows such that the comparable spindle in each horizontal row combine to constitute a vertical row. Similarly the rotating spindles 12 define generally vertical rows and these vertical rows of rotating spindles are disposed generally midway between the vertical rows of stationary spindles. Thus, in viewing from left to right the first spindles 12 in the two horizontal rows as shown combine to constitute a vertical row disposed intermediate the first two vertical rows of stationary spindles 11, which rows constitute the first spindles in each of the three horizontal rows and the second spindles in each of the three horizontal rows.

As best shown in FIGURE 4, the stationary spindles are mounted in bushings 13 in order to hold the spindles 11 in fixed relationship relative to the panel or head 10. The panel 10 as shown in FIGURE 4 comprises vertically disposed, spaced apart front and rear walls 14 and 15, respectively. It is in these walls that the stationary and rotating spindles are supported to cause them to function as a harvesting panel of fruit from a tree in which fruit is to be harvested. The panel 10 includes a top spacer block 16 and a bottom spacer block 17 of substantially equal dimensions so that the panel is generally rectangular in shape as shown in the cross sectional view of FIGURE 4. A sleeve type bushing 18 is adapted to journally support the rotating spindles 12 in and through the front wall 14 of the panel 10. Axially aligned sleeve bushings 19 are employed to journally support the rearward ends of the rotating spindles 12 in the rear wall 15 of the panel 10. It is thus apparent that in the device as illustrated herein the stationary spindles 11 are supported solely in the front wall 14 of the panel 10 and that the rotating spindles are journally supported in both the front and rear walls 14 and 15 of the panel to thereby provide for spindle driving mechanisms between the front and rear walls.

Figure 1:
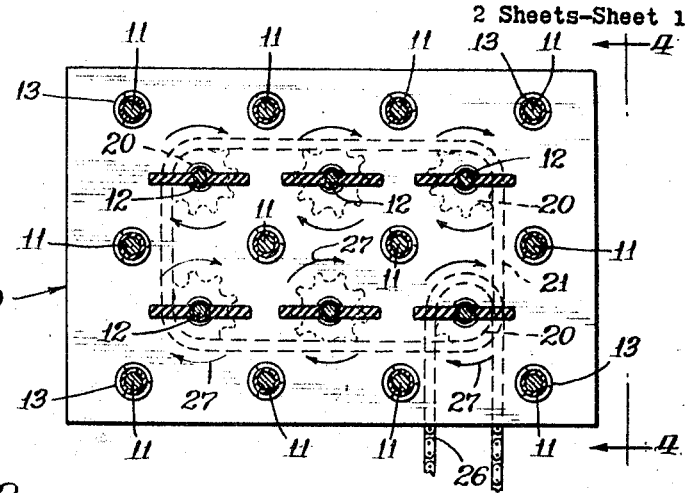
FIGURE 1 is a front elevational view partially in section of a fruit picking panel as used in this invention.

As further best shown in FIGURE 4, sprockets 20 are mounted on each of the rotating spindles and particularly on that portion confined between the front and rear walls 14 and 15 of the spindle panel 10. An endless chain 21 joins all of the sprockets 20 and this feature is shown in both FIGURES 1 and 4. A rearward extension 22 of one of the rotating spindles 12 projects beyond the rear wall 15 of the panel 10 and is adapted to carry a sprocket 23 thereon. The sprocket 23 is fixedly mounted to the shaft extension 22 by means of a hub or sleeve 24 which abuts the rearward side of the sprocket 23 and is held thereto by a pin 25. A driven chain 26 is mounted on the sprocket 23 and is adapted to impart rotational drive to the sprocket and also acts to drive all of the rotating spindle shafts 12. The means for actuating the chain 26 is not shown for the reason it does not form a specific part of the present invention. It is sufficient that some means is employed to rotationally drive the chain 26, whereupon all of the rotating spindles 12 move in a single direction of rotation as shown by the arrows 27.

As shown in FIGURE 4 an annular groove or undercut 28 is provided in each of the rods of the stationary spindles 11 at a location spaced inwardly of the outer free or non-driving ends of the spindles 12. A rubber or like material sleeve 29 is employed to substantially fill the annular groove 20 of the stationary spindles 11. It should be understood that the use of the term "rubber" means any material or synthetic rubbers or plastic materials which have an elastic or resilient characteristic. Similarly an annular groove or undercut 30 is provided in each of the rods of the rotating spindles 12 at a location on the length of the spindles corresponding to the position of the annular grooves on the stationary spindles 11. Siimlarly, rubber or like material sleeves 31 are cemented or otherwise fastened in the annular grooves 30 of each rotating spindle 12. Each of the sleeves 31 substantially fills the annular grooves and is provided with diametrically opposed radially extending fins 32 and 33 formed integrally therewith.

Figure 2:
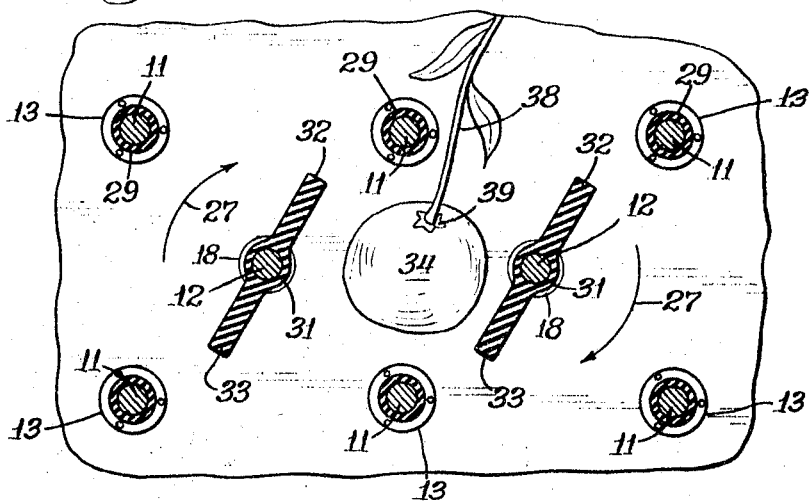
FIGURE 2 is an enlarged detail sectional view taken in such a manner as to show the relative positioning of the fruit to be harvested with the spindle picking fins prior to removal of the fruit from the tree.

In operation, the panel or harvesting head 10 is positioned adjacent a fruit tree, such as an orange tree, from which fruit is to be harvested. The panel 10 is then located in relation to a tree so that all of its spindles, including stationary and rotating spindles, penetrate the outer surface of the tree branches. This penetration of the outer surface of the tree branches by the spindles causes a positioning of the fruit to be harvested in various arrangements within the confines of the stationary and rotating spindles 11 and 12. FIGURES 2 and 3 depict one such arrangement of the fruit relative to the harvesting spindles and similarly FIGURES 5 and 6 depict another arrangement of the fruit to be picked relative to the harvesting spindles.

In FIGURE 2 the fruit 34 lies loosely in the space between adjacent rotating spindles 12 in such a manner that the fins 32 and 33 merely flank the fruit on both sides. In this position the diametrically disposed fins are substantially vertically disposed. The spindles are preferably constantly rotating during insertion into the tree and it has been found the fruit hanging irregularly within the tree will seek a free hanging position within the spindles. As we have just stated, the spindles 12 are constantly rotating and in the illustration of FIGURE 3 the fruit 34 to be harvested is engaged on opposite sides thereof by the rearwardly bent portions of the fins 32 and 33. As the spindles 12 rotate in the direction of the arrows 27 the space between the spindles 12 holding the fruit 34 quickly closes, causing the fins 32 and 33 of adjacent spindles to be snugged up against the fruit 34 with the fin 32 of the one spindle 12 moving downwardly as shown by the arrow 35 in FIGURE 3, and the fin 33 of the adjacent spindle 12 moving upwardly as shown by the arrow 36. This engagement of the fruit by fins of adjacent spindles causes the included fruit to be twisted about its center as an axis in the direction of the arrows 37 as shown in FIGURE 33. This causes the fruit 34 to separate from its stem 38 at its calyx 39. There has thus been described one means of removing fruit from its tree engagement. Once the fruit is severed from its stem and it is released from the twisting fins, it is permitted to drop downwardly through the spindles of the harvesting panel and by means of various devices such as catchers which are not shown, the fruit is collected. The catching and collecting of the fruit forms no part of this invention and hence such devices have not been shown in the drawings. It is the purpose of the present invention to cause the fruit to be severed from its engagement with the tree stems in a most facile manner with a minimum of damage to the fruit and without a tearing of the calyx from the skin of the fruit. The twisting of the fruit about its own axis tends to simulate the method of removal of tree fruit by manual labor.

As best shown in FIGURE 5, the fruit is designated by the numeral 40 and hangs in a space within the fruit harvester between adjacent rotating spindles 12 somewhat similar to that shown in FIGURE 2 but also somewhat lower so that the fruit is closer to a stationary spindle 11 on its underside. As the spindles 12 rotate in the direction of the arrows 27, the fins 32 move downwardly causing the fruit 40 to be pushed by the fin 32 of one of the rotating spindles 12 against the stationary spindle 11 and particularly against the rubber sleeve 29 of that stationary spindle. The arrow 41 indicates the downward wiping or twisting direction of the fin 32. This illustration is depicted in FIGURE 6 of the drawings, which shows the successive positioning of the fins relative to the fruit following their rotation from the illustration of FIGURE 5. The fin 32 is bent back so that it covers a substantial surface of the fruit to be removed from the tree. This gives the fruit 40 a twisting action substantially the same as that accomplished in the fruit removal of FIGURE 3. This twisting action in FIGURE 6 is accomplished by a reactance of the single rotating fin 32 and the stationary spindle 11 which causes the included fruit 40 to spin about its own axis in the direction of the arrows 42. This twisting action causes the fruit 40 to be severed from its stem 43 at the point of the calyx 44 of the fruit being harvested. Here again there is a substantial simulation of the manual removal of the fruit from a tree and the fruit is thereby removed with a minimum of damage or no damage to the fruit during its stem severing operation. After the separation of the fruit from the stem occurs and the fin 32 passes from engagement with the fruit, the fruit is free to drop downwardly through the panel spindles and be received by any desired collecting means as previously explained for removal of the fruit as illustrated in FIGURE 3.

The subject invention is concerned with the harvesting of hard fruit from a tree with a minimum of damage to that fruit. The fruit harvesting is accomplished by a panel having plural spindles adapted to lie in parallel relationship one with the other and to penetrate the surface of the tree so that the spindles and their fins substantially flank the fruit growing on the tree. The invention concerns in detail the particular arrangement of stationary spindles relative to and substantially surrounding each rotating spindle and the inclusion on the rotating spindles of fruit engaging fins adapted to accomplish the fruit twisting and the removal of the fruit from the tree stems.

I am aware that numerous details of construction may be varied throughout a wide range without departing from the principles disclosed herein, and I therefore do not propose limiting the patent granted hereon otherwise than as necessitated by the appended claims.

What is claimed is:

1. A fruit harvester head including a support positionable in proximity to a fruit crop to be harvested, a plurality of spindles carried on said support, said spindles arranged in generally horizontal rows, the spindles of alternate generally horizontal rows being finless, the spindles of the alternate intermediate generally horizontal rows being rotatable and each having two fins arranged in diametrically disposed position thereon, each of said finless spindles of said alternate generally horizontal rows forming generally vertical rows with the correspondingly located spindles in said rows, each of said two fin rotatable spindles of said alternate intermediate generally horizontal rows forming generally vertical rows with the correspondingly located spindles in the several rows, and said vertical rows of two fin spindles interposed between each of the adjacent vertical rows of finless spindles.

2. A device as set forth in claim 1 in which each of said spindles includes a generally rigid rod, said rod having an annular groove, and a rubber sleeve generally filling said annular groove.

3. A device as set forth in claim 2 in which the two fins are rubber fins molded integrally with said rubber sleeve.

4. A fruit harvester head including a support positionable in proximity to a fruit crop to be harvested, a plurality of spindles carried on said support, said spindles arranged in generally horizontal and vertical rows, the spindles of alternate generally vertical rows being finless, the spindles of the alternate intermediate generally vertical rows being rotatable and each having two fins arranged in diametrically disposed position thereon, each of said two fin rotatable spindles being generally surrounded by finless spindles.

5. A fruit harvester head including a support positionable in proximity to a fruit crop to be harvested, a plurality of spindles carried on said support, said spindles arranged in generally horizontal rows, the spindles of alternate generally horizontal rows being finless, the spindles of the alternate intermediate generally horizontal rows being rotatable and each having at least one radial fin thereon, each of said finless spindles of said alternate generally horizontal rows forming generally vertical rows with the correspondingly located spindles in said rows, each of said finned rotatable spindles of said alternate intermediate generally horizontal rows forming generally vertical rows with the correspondingly located spindles in the several rows, and said vertical rows of finned spindles interposed between each of the adjacent vertical rows of finless spindles.

References Cited

UNITED STATES PATENTS

| | | | |
|---|---|---|---|
| 1,077,640 | 11/1913 | Randall | 56—328 |
| 3,040,507 | 6/1962 | Lasswell | 56—328 |
| 3,129,551 | 4/1964 | Lasswell | 56—328 |
| 3,153,311 | 10/1964 | Pool | 56—328 |
| 3,197,952 | 8/1965 | Lasswell | 56—328 |
| 3,222,855 | 12/1965 | Lasswell | 56—328 |

ANTONIO F. GUIDA, Primary Examiner

PASQUALE A. RAZZANO, Assistant Examiner